United States Patent [19]
Yokobayashi

[11] Patent Number: 5,342,663
[45] Date of Patent: Aug. 30, 1994

[54] PREFORM FOR MAKING A PLASTIC CAN BODY

[75] Inventor: Kazuyuki Yokobayashi, Ueda, Japan

[73] Assignee: Nissei ASB Machine Co., Ltd., Nagano, Japan

[21] Appl. No.: 780,351

[22] Filed: Oct. 22, 1991

[30] Foreign Application Priority Data

Oct. 26, 1990 [JP] Japan .................................. 2-289420

[51] Int. Cl.$^5$ ............................................. B65D 23/00
[52] U.S. Cl. .................. 428/35.7; 428/542.8; 215/1 C
[58] Field of Search ............... 428/35.7, 81, 156, 192, 428/213, 542.8; 215/1 C; 206/139

[56] References Cited

U.S. PATENT DOCUMENTS

| | | | |
|---|---|---|---|
| 3,978,232 | 8/1976 | Dodsworth et al. | 426/115 |
| 4,496,064 | 1/1985 | Beck et al. | 215/1 C |

FOREIGN PATENT DOCUMENTS

| | | |
|---|---|---|
| 0140719 | 5/1985 | European Pat. Off. . |
| 0228324 | 7/1987 | European Pat. Off. . |
| 1108895 | 6/1961 | Fed. Rep. of Germany . |
| 58-501991 | 11/1983 | Japan . |
| 60-25734 | 2/1985 | Japan . |
| 60-72720 | 4/1985 | Japan . |
| 83/01766 | 5/1983 | PCT Int'l Appl. . |

*Primary Examiner*—Charles R. Nold
*Attorney, Agent, or Firm*—Oliff & Berridge

[57] ABSTRACT

A preform is used for making a plastic can body by the biaxial stretch blow molding process. The preform is a cylindrical member having a bottom wall, a side wall, a shoulder and a flange extending outwardly from the shoulder. The flange has a thickness of about one-third of the thickness of the side wall. The shoulder is gradually thinned to form the flange. The flange is not subject to the biaxial stretch blow molding process, maintaining its injected profile, having a mechanical durability and non-gas-permeability due to flow orientation of plastic molding material which is made to flow through a relatively narrow area. The flange is double-seamed with a lid.

2 Claims, 4 Drawing Sheets

PREFORM FOR MAKING A PLASTIC CAN BODY

BACKGROUND OF THE INVENTION

1. Field of the Invention

This invention relates to a preform for making a plastic can body without a cutting process and to a method of manufacturing a plastic can body by using such preform.

2. Description of the Related Art

Fluids such as drink and oil have been usually held in iron or aluminum cans up to now. With a wide use of plastic bottles in place of glass bottles, there is a large demand to hold such fluid in can-like plastic containers.

Examples of such containers are disclosed in Japanese Patent Publication Sho-58 501991, and Japanese Patent Laid-Open Publications Sho-60 25734 and Sho-60 72720.

With these conventional examples, a preform is made by the injection molding process, then being subject to the biaxial stretch blow molding process to form a container having a flange around its top. The container is cut at an unnecessary portion of the flange by a cutter. The flange serves to double seam a lid.

The blow-stretched flange is small in thickness but has a sufficient mechanical strength due to the orientation of the plastic material, and also has properties to prevent permeation of gas into the container. Since such a blow-stretched flange is formed as part of a side wall of the container, it is inevitable to cut an unnecessary portion of the flange by a cutter or the like. The cut edge of the flange may be nicked. Even if the flange is formed by the biaxial stretch blow molding process to have the stretching orientation, extensive stress will be applied to the cut edge of such flange, which would cause cracks in the cut edge, reduce the mechanical strength and durability when the flange is curled and double-seamed with the lid.

Forming the flange by the stretch blow molding process largely depends upon conditions such as material and molding process. Therefore, it is very difficult to produce the flange having a uniform thickness. Sometimes, the flange has a different thickness in its circumferential direction.

In the foregoing methods, the cutting process not only complicates the container manufacturing process but also makes the flange less reliable in its dimensions and durability.

SUMMARY OF THE INVENTION

It is therefore an object of this invention provide a preform having a flange through the injection molding process. The preform except for the flange is biaxially blow-stretched to form a container. The flange is therefore precisely dimensioned, having mechanical durability to be double-seamed with a lid. No cutting process will be necessary for the flange.

Another object of this invention is to provide a method of manufacturing a plastic can body by using such preform.

According to this invention, there is provided an integrally injection-molded plastic cylindrical preform for making a plastic can body by the biaxial blow stretch molding process, comprising: a bottom wall and a side wall; a flange extending outwardly to a preset length From the side wall to be double-seamed with a lid, the flange having a thickness of one-third or less of the thickness of the side wall; and a shoulder for connecting the flange and the side wall, the shoulder being gradually thinned toward the flange.

With this arrangement, a preform is formed by the injection molding process so that a flange extends outwardly from the side wall. The flange is not subject to the biaxial blow stretch molding process, thereby keeping its original shape and precision dimension to be double-seamed with the lid.

Since the molding material is charged into a narrow region for the thin flange and through a wide region for the relatively thick side wall and the shoulder, the material becomes mechanically strong and durable due to its flow orientation. The flange is preferably one-third or less thick than the side wall. The flange is more preferably one-fifth or less thick than the side wall. The side wall of the preform is thick enough to be stretched vertically and horizontally to obtain a plastic can body of an optimum thickness as the final product.

The flange is preferably 0.3 mm to 0.7 mm thick. When the flange is thinner than the minimum limit, the molding material will not be sufficiently filled in the flange area. When the flange is thicker than the maximum limit, the material will not show the flow orientation, being difficult to have a mechanical strength for the double-seaming.

The portion of the shoulder near the flange is preferably as thick as the flange, since this portion has to be somewhat deformed to be double-seamed with the flange and the lid. This portion is preferably curved to enhance the double-seaming of the flange and the lid without cracks.

According to this invention, there is provided a method of manufacturing a plastic can body, comprising: injection-molding the cylindrical preform of this invention having the flange at the opening side thereof, by using a neck mold for defining the flange and part of an outer wall of the shoulder, an injection cavity mold for defining the other outer wall of the preform, and a core mold for defining an inner wall of the preform; releasing the core mold and the cavity mold to carry the preform by the neck mold to a succeeding process; and biaxially stretch blow molding the preform to form a plastic can body.

After the injection-molded preform held by the neck mold is subject to the biaxial stretch blow molding process, a plastic can body as a final product is obtained without any cutting process, thereby shortening a period of one molding cycle. Since the preform is not cut, no plastic tips will enter in the interior of the can body, thereby producing plastic can bodies with a high throughput.

DETAILED DESCRIPTION

This invention will be now described with reference to a preferred embodiment shown on the accompanying drawings.

Figure 1:
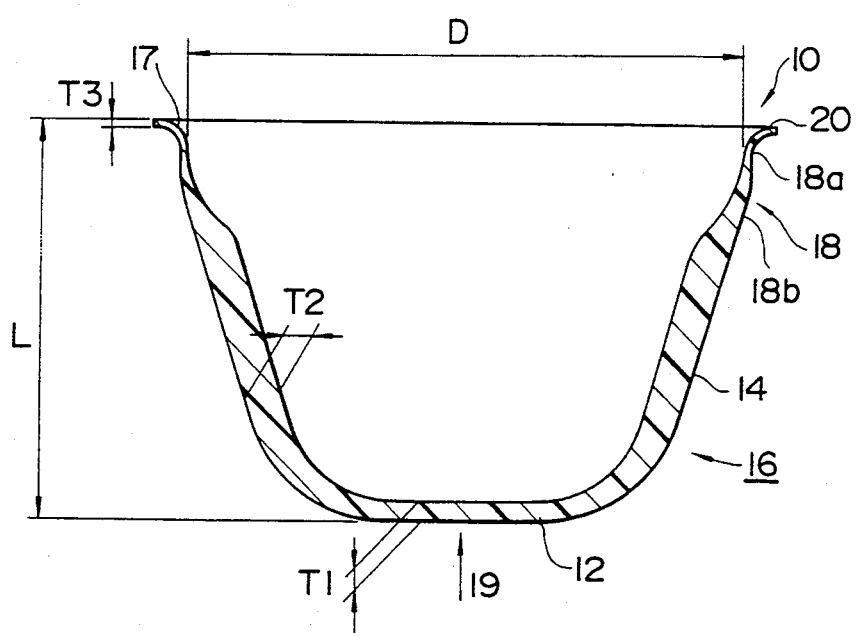
FIG. 1 shows a cross section of a preform according to one embodiment of this invention.

As shown in FIG. 1, a preform 10 made of polyethylene terephthalate (hereinafter called "PET") is a cylindrical member 16, which has a bottom wall 12, a side wall 14, a shoulder 18, and a flange 20 extending outwardly, and radially from the side wall 14 via the shoulder 18. The flange 20 extends from the shoulder 18 via a portion 17 curved with a preset radius. The preform 10 is wide-mouthed, having a vertical length L and a diameter D at the top. The ratio between L and D is $L/D<1$. For instance, L=40.1 mm, and D=57.21 mm.

A thickness $T_1$ of the bottom wall 12 is smaller than a thickness $T_2$ of the side wall 14. $T_1$ is 2 mm while $T_2$ is 5 mm. A thickness $T_2$ of the side wall 14 may be variable for forming a thickness distribution in the axial direction.

The preform 10 has the smallest thickness at the flange 20, which will be double-seamed with the lid. Held by a neck mold (to be described later), the flange 20 is scarcely biaxially stretched during the biaxial blow stretch molding process. A thickness $T_3$ of the flange should be $T_3 < T_2 \times (\frac{1}{3})$, and preferably $T_3 < T_2 \times (1/5)$. In this embodiment, $T_3 = 0.5$ mm, and preferably between 0.3 mm and 0.7 mm.

The portion having the largest thickness $T_2$ of the side wall 14 is gradually thinned to form the flange 20 of the smallest thickness $T_3$ via the shoulder 18. An upper region, 18a of the shoulder 18 is seldom subject to the biaxial stretch blow molding process similarly to the flange 20 since the portion 18a is also held by the neck mold. The upper portion 18a has the thickness which is substantially the same as the thickness $T_3$ of the flange 20. A portion 18b at the lower part of the shoulder 18 is gradually made thicker, being subject to the biaxial stretch blow molding process.

The molding material PET is filled into an injection mold (to be described later) through a gate 19, thereby forming a preform 10. In this case, PET is injected into the narrow area for the flange 20 via the area for the side wall 14 and the shoulder 18, thereby being oriented in the flowing direction. Therefore, the flange 20 can have a sufficient mechanical strength to receive the lid seamed. therearound, and can prevent permeation of gas.

According to this embodiment, the injection-molded preform 10 undergoes a temperature control process, and the biaxial blow stretch molding process by using a stretching rod and a pressured fluid. The flange 20 held by the neck mold can be used for receiving the lid to be seamed therearound without any cutting process.

Figure 2:
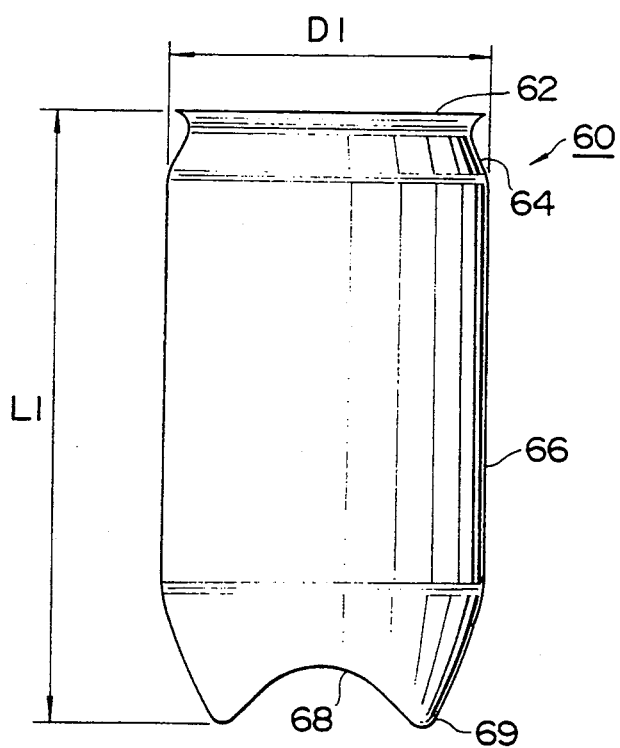
FIG. 2 shows a cross section of a can body made by the biaxial stretch blow molding process applied to the preform of FIG. 1.

FIG. 2 shows one example of a plastic can body 60 made by biaxially blow stretch molding the preform 10. The flange 62 of the can body 60 is as wide and as thick as the flange 20 of the preform 10. The lower region of the shoulder 64, the side wall 66 and the bottom wall 68 of the can body 60 are biaxially stretched so that the can body 60 has the vertical length L, of 123 mm and the largest diameter $D_1$ of 66.04 mm at the side wall 64. In this embodiment, the preform 10 is vertically stretched nearly three times while it is laterally stretched less than twice at maximum. Specifically, it is different from the prior art that the can body 60 is obtained by blow molding the preform 10 at a relatively low ratio of horizontal stretching.

The can body 60 has a leg portion 69 which will be shaped according to a substance, to be held therein. For example, the bottom of the can body 60 may be shaped like a bottom of a champagne bottle as shown in FIG. 2.

The preform 10 will be made by the injection-molding process, undergoing a succeeding temperature control process and biaxial blow stretch molding as shown in FIGS. 3A to 3D.

Figure 3A:
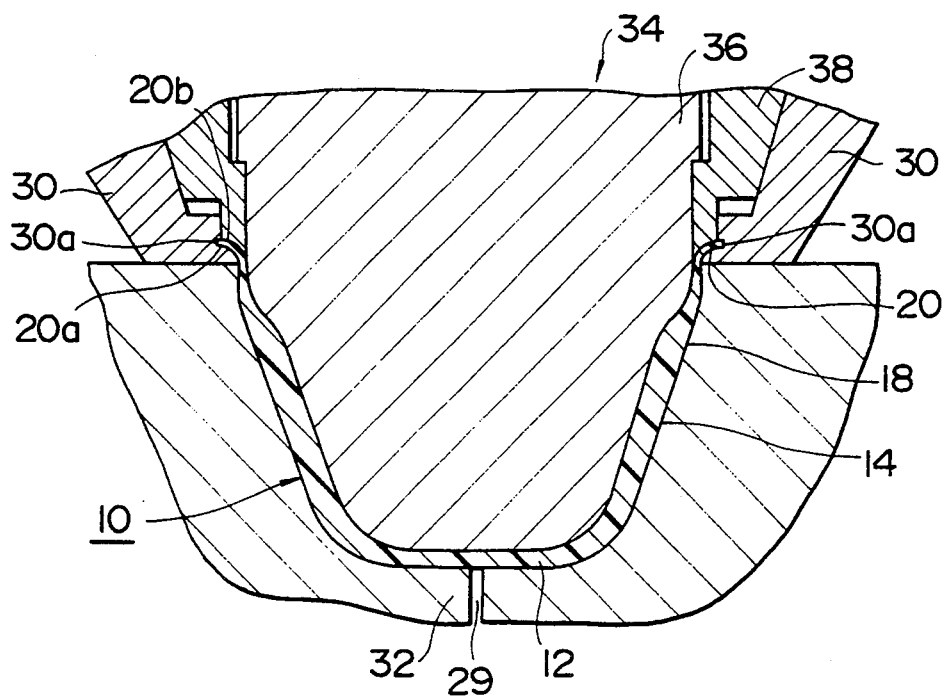
FIG. 3A to FIG. 3D show how to make the plastic can body by using the preform of FIG. 1.

FIG. 3A shows how to injection-mold the preform 10. An injection mold system comprises a neck mold 30 for defining the flange 20 and the outer wall of at least part of the shoulder 18, a cavity mold 32 for defining the other outer wall of the preform 10, and a core mold 34 for defining the inner wall of the preform 10.

The core mold 34 includes a first core mold 36 for defining an inner surface of the bottom wall 12 and of the side wall 14, and a second core mold 38 for defining the inner surface of the upper peripheral edge of the preform 10.

As shown in FIG. 3A, the neck mold 30 includes mold halves which are openable to the right and left in the plane of the FIG. 3A. The neck mold 30 also serves to carry the preform 10 to the succeeding process. After the biaxial stretch blow molding process, the mold halves are opened to eject the can body 60, thereby completing one molding cycle. Then, the neck mold 30 is returned to the preform injection-molding system. The molding cycle is repeated by circulating the neck mold 30. The neck mold 30 preferably has a groove 30a for defining the upper peripheral edge 20b of the flange 20 as well as for supporting the lower portion 20a of the flange 20, as shown in FIG. 3A, thereby preventing the preform 10 from being vertically displaced during transportation to the succeeding process.

The PET resin is filled through a gate 29 of the cavity mold 32 to injection-mold the preform 10. The PET resin is oriented while it is forced to flow to the flange 20. It is preferable to apply a relatively high pressure to the PET resin so that it flows sufficiently to the flange 20 which is farthest from the gate 29.

Figure 3B:
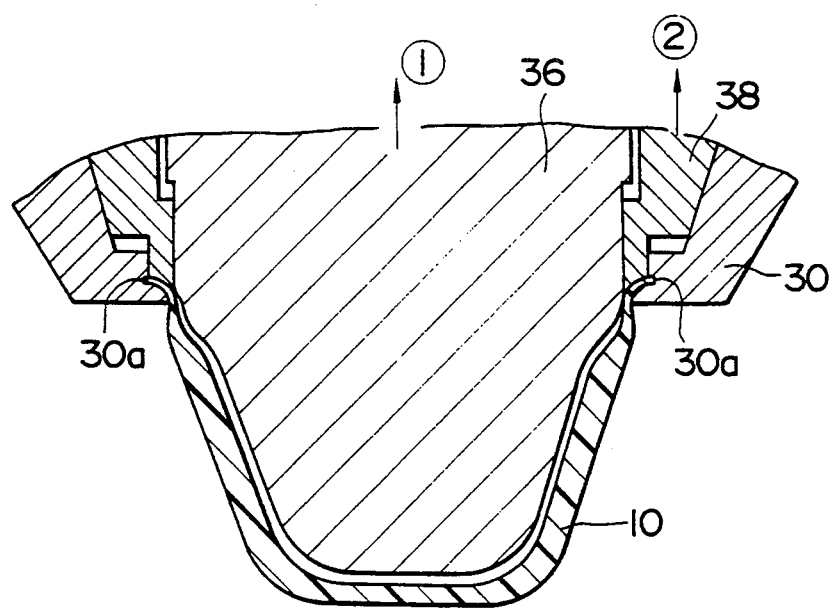

FIG. 3B shows how the injection mold is released. Both the core mold 34 and the cavity mold 32 should be released from the preform 10 before carrying the preform 10 to the succeeding process.

The core mold 34 is split into the first and second core molds 36, 38 for the following reason. If the core mold 34 is released as one unit, the preform 10 tends to move with the core mold 34 since it is hot just after the injection molding. This phenomenon cannot be prevented even if the flange 20 of the preform 10 is supported by the neck mold 30 at the groove 30a. Therefore, the preform 10 gets out of the groove 30a to move with the core mold 34, moves only its bottom to be deformed, or fails in the cavity mold 32 during movement.

To overcome this inconvenience, the first core mold 36 is released firstly. The preform 10 is supported at its upper wide region by the neck mold 30 and the second core mold 38 not to move with the first core mold 36. After at least the outer surface of the first core mold 36 is completely released from the inner surface of the preform 10, the second core mold 38 is started to be released. Since the second core mold 38 contacts the preform at a narrow area compared with the first core mold 36, it is sufficient so long as the groove 30a of the neck mold 30 can grip the preform 10. Thus, the preform 10 is protected from being released from the neck mold 30.

Figure 3C:
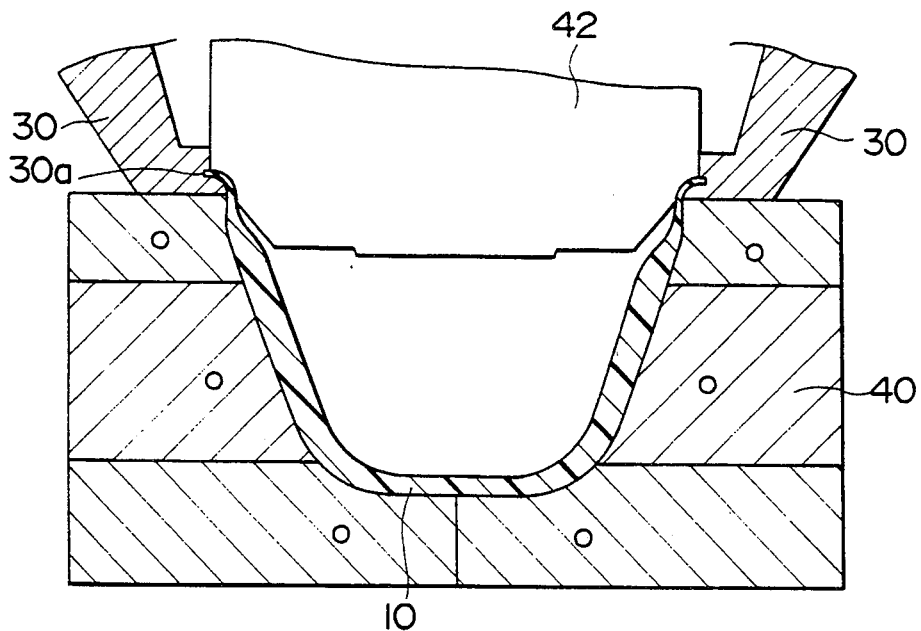

FIG. 3C shows a manner in which the preform 10 is temperature-controlled.

The preform 10 is carried to the temperature control process while being gripped by the neck mold 30, which is moved rotatably or linearly. In this embodiment, since the neck mold 30 has the groove 30a to hold the preform 10 vertically, the preform 10 will never fall from the neck mold 30.

The preform 10 is set in a temperature control pot 40, to which a temperature control core 42 is inserted near the mouth of the preform 10.

Figure 3D:
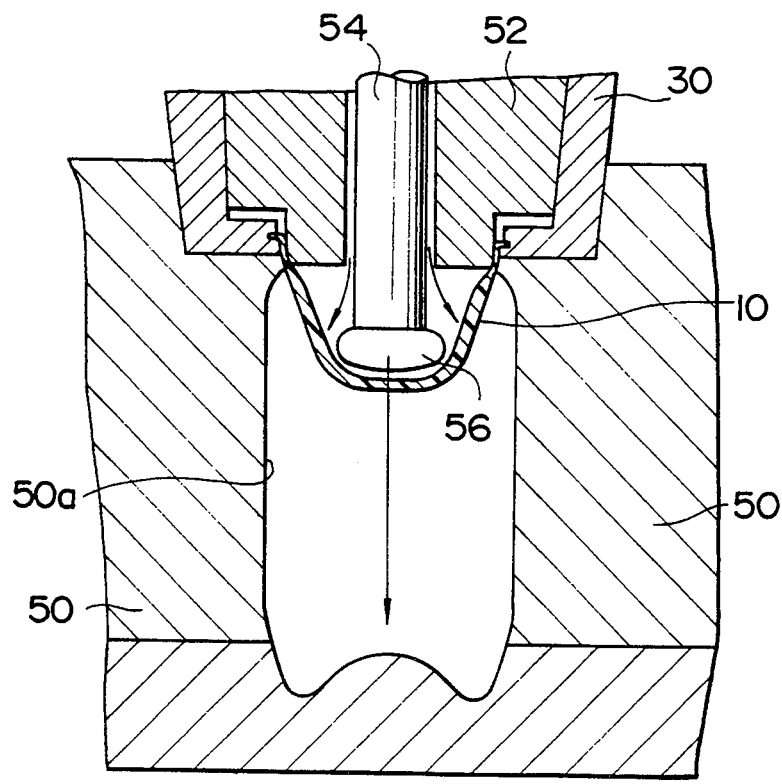

FIG. 3D shows the biaxial stretch blow molding process for the preform 10. The preform 10 is carried to this process by the neck mold 30.

The biaxial stretch blow molding unit comprises a blow cavity mold 50 having a cavity face 50a corresponding to the final shape of the can body. The preform 10 held by the neck mold 30 is placed in the blow cavity mold 50 having mold halves openable horizontally. Then, a blow core mold 52 is inserted into the blow cavity mold 50 through the mouth of the preform 10. The blow core mold 52 supports the stretching rod 54 which is vertically movable. To biaxially blow-stretch the preform 10 to obtain the can body 60, a top 56 of the stretching rod 54 is contacted with the inner surface of the bottom wall 12 of the preform 10. Then, the stretching rod 54 is downwardly moved to stretch the preform 10 vertically. Simultaneously with or after the vertical stretching, fluid such as air is blown into the preform 10 to stretch it horizontally and radially. The preform 10 made of PET is biaxially oriented to form the can body 60 in the final shape along the cavity face 50a.

In this case, held by the neck mold 30, the flange 20 is not biaxially stretched. The flange 20 is designed to have the thickness $T_3$. In addition, PET composing the can body is oriented while it flows through the molds, thereby making the flange 20 strong enough to receive a lid double-seamed therearound.

Then, can body 60 thus formed receives a label, is filled with a substance and is sealed by a double seaming method as disclosed on page 41, of "Metal Containers for Food Canning, and Double Seaming," published by Japan Canned Food Association, Inc. Specifically, the curled portion of the lid and the flange 62 of the can body 60 are fitted and seamed by a first seaming roll in a first step, and then the fitted and seamed portion is pressed by a second seaming roll in a second step. A sealing compound is filled in a gap between the seamed portion to seal the can body.

Figure 4:
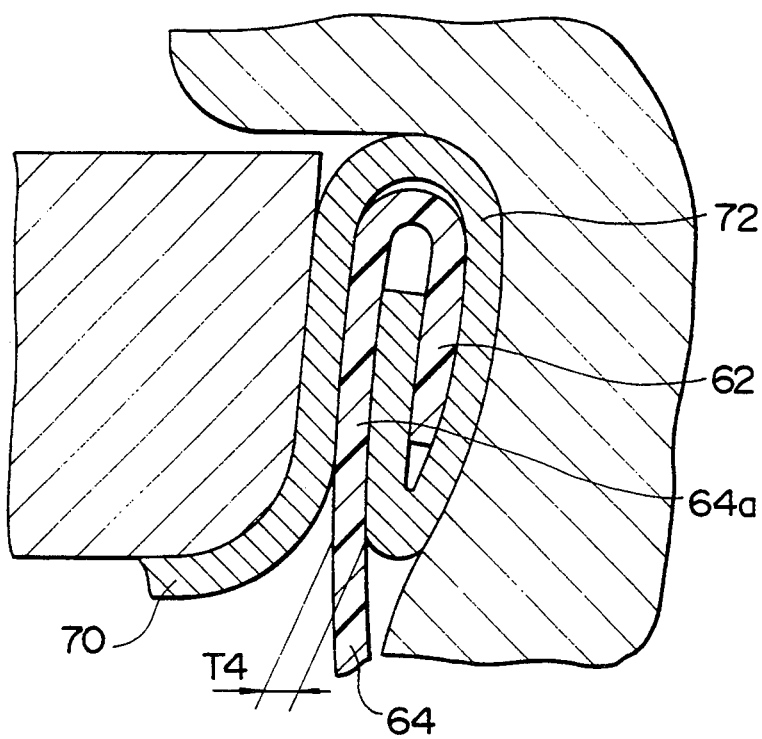
FIG. 4 shows how a flange of the plastic can body is double-seamed with a lid.

FIG. 4 shows how the curled portion 72 of the lid 70, the flange 62 and upper portion 64a of the shoulder are double-seamed. For this purpose, the flange 62 is required to have the shape and dimension to fit with the lid. Since the preform 10 is injection-molded, the flange can be formed very precisely to improve the quality of the double seaming compared with the flange which is formed by cutting unnecessary portions of the preform. The thickness $T_4$ of the upper portion of the shoulder 64 is preferably equivalent to the thickness $T_3$ of the flange 62 so that the curled portion 72 of the lid can be deformed to seam the flange 62 completely. The portion 64a of the shoulder 64 corresponds to the upper portion 18a of the shoulder 18 of the preform 10. The thickness of the upper portions 64a and 18a are controlled during the injection molding of the preform 10. Since the portion 64a, i.e. the portion 18a of the preform 10, is sandwiched between the neck mold 30 and the blow core mold 54, this portion is not biaxially stretched in the biaxial blow stretch molding process. The upper portion 64a which has to be as thick as the flange 62 can be effectively controlled to the preset thickness during the injection molding process.

It should be noted that this invention is not limited to the foregoing embodiment but can be modified as desired within the scope of the subject matter thereof.

The dimensions of the preform are given as an example, and may be determined depending upon the size of the can body as the final product and the size of the lid to be double-seamed. As for the resin material, it may be determined depending upon a kind of the substance to be filled in the can body. However, it should be noted that the thickness $T_3$ of the flange and the maximum thickness $T_2$ of the side wall 20 or the preform 10 should be kept in the range defined in this invention, since the flange 20 of the preform 10 is not stretched during the biaxial stretch blow molding process.

According to this invention, the flange which is not stretched during the biaxial stretch blow molding process is thinnest while the side wall of the preform is several time as thick as the flange, so that the preform having a large mouth is blow-stretched to obtain a desired can body, which has a flange of the desired dimension without any cutting process.

After the injection molding, the preform proceeds with a cycle of the temperature control process and the biaxial stretch blow molding process while being supported by the neck mold, thereby extensively speeding up the molding cycle of the plastic can body.

What is claimed is:

1. A plastic cylindrical preform for making a plastic can body by a biaxial stretch blow molding process, the preform having a vertical length, the preform comprising:

(a) an opening at the top of said preform, a diameter of said opening being larger than the vertical length of said preform;

(b) a body having a bottom wall and a side wall;

(c) a flange extending outwardly to a preset length from said side wall, said flange to be seamed with a lid, said flange having a thickness of one-third or less of the largest thickness of said side wall; and (d) a shoulder which connects said flange and said side wall, an upper part of said shoulder near said flange having a same thickness as said flange and having a curve of a preset radius, the rest of said shoulder having a gradually reduced thickness toward said upper part, and said upper part to be seamed with the lid.

2. A preform according to claim 1, wherein said flange and said upper part of said shoulder are 0.3 mm to 0.7 mm thick.

* * * * *